(12) United States Patent
Betancourt et al.

(10) Patent No.: US 7,100,003 B2
(45) Date of Patent: Aug. 29, 2006

(54) METHOD AND APPARATUS FOR GENERATING DATA FOR USE IN MEMORY LEAK DETECTION

(75) Inventors: Michel Betancourt, Morrisville, NC (US); Dipak Manharbhai Patel, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 344 days.

(21) Appl. No.: 10/720,436

(22) Filed: Nov. 24, 2003

(65) Prior Publication Data

US 2005/0114844 A1 May 26, 2005

(51) Int. Cl.
*G06F 12/00* (2006.01)
(52) U.S. Cl. .............. 711/159; 711/170; 707/206; 717/128
(58) Field of Classification Search ............... 711/159
See application file for complete search history.

(56) References Cited

U.S. PATENT DOCUMENTS

| | | | |
|---|---|---|---|
| 6,226,761 B1 * | 5/2001 | Berstis | 714/37 |
| 6,247,154 B1 * | 6/2001 | Bushnell et al. | 714/733 |
| 6,289,360 B1 * | 9/2001 | Kolodner et al. | 707/206 |
| 6,317,869 B1 * | 11/2001 | Adl-Tabatabai et al. | 717/132 |
| 6,370,684 B1 | 4/2002 | De Pauw et al. | 717/4 |
| 6,560,773 B1 | 5/2003 | Alexander, III et al. | 717/128 |
| 6,594,749 B1 | 7/2003 | Czajkowski | 711/170 |
| 2002/0107879 A1 * | 8/2002 | Arnold et al. | 707/206 |
| 2004/0181562 A1 * | 9/2004 | Findeisen | 707/206 |
| 2005/0114413 A1 * | 5/2005 | Subramoney et al. | 707/206 |

* cited by examiner

*Primary Examiner*—Matthew Kim
*Assistant Examiner*—Michael Krofcheck
(74) *Attorney, Agent, or Firm*—Duke W. Yee; A. Bruce Clay; Gerald H. Glanzman

(57) ABSTRACT

A method, apparatus, and computer instructions for collecting data for analyzing memory leaks. A plurality of indicators are associated with a plurality of objects. The plurality of indicators are set to a first state. An indicator is set for each live object in the plurality of objects to a second state. In response to a request for the data, data is collected from all objects in the plurality of objects having indicators set to the first state.

25 Claims, 3 Drawing Sheets

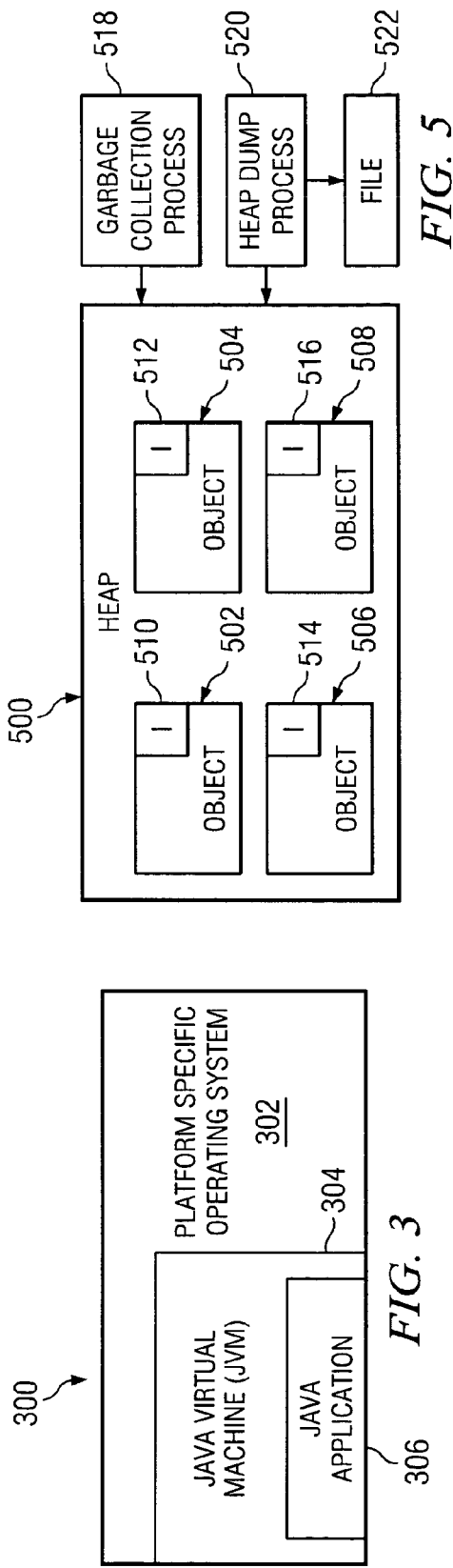
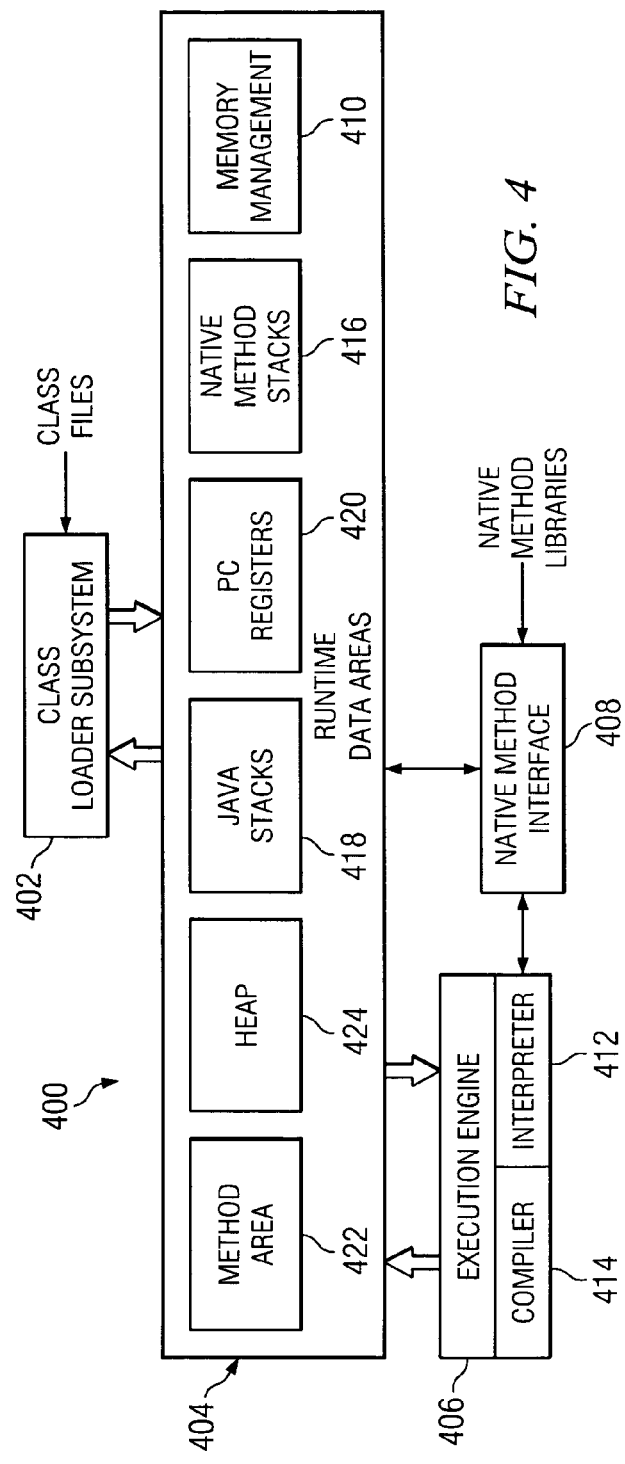

METHOD AND APPARATUS FOR GENERATING DATA FOR USE IN MEMORY LEAK DETECTION

BACKGROUND OF THE INVENTION

1. Technical Field

The present invention relates generally to an improved data processing system and in particular, a method and apparatus for processing data. Still more particularly, the present invention provides a method, apparatus, and computer instructions for generating data used in detecting memory leaks.

2. Description of Related Art

In designing and creating programs, various tests and debugging procedures are performed to ensure that the programs are performing up to an expected level or standard. Debugging software is used to find the errors in the program logic. Different types of debugging may be performed on a program. One type of debugging that occurs in a software production environment involves debugging memory leaks.

A memory leak is a condition caused by a program that does not free up the extra memory that the program allocates. In programming languages, such as C/C++, a programmer can dynamically allocate additional memory to hold data and variables that are required for the moment, but not used throughout the program. When those memory areas are no longer needed, these memory areas should be deallocated.

When memory is allocated for storing information that has no future use, but it continues to occupy memory, a memory leak is said to have occurred. If too many memory leaks occur, these memory leaks may use up all of the memory and bring everything to a halt, or slow the processing considerably. In other environments, such as Java, the Java virtual machine allocates and deallocates memory automatically. In Java, when objects are created in the memory and they continue to reside in the heap after their use, a memory leak can occur, especially if those objects do not have any future use.

Existing tools for debugging memory leaks are too heavy weight to make them practical. Further, debugging memory leak problems using profilers in a software production environment is either impossible or impractical because it is a high risk proposition. Debugging memory leaks using commercial profilers is a long and tedious process, requiring specialized skills. Further, it is often not possible for a customer to reproduce problems in a test environment.

Heap dumps may be used in a production environment in an attempt to identify memory leaks. A heap is a common pool of memory that is available to a program. The management of the heap may be performed either by the applications themselves, allocating and deallocating memory as required, or by the operating system or other system program. A heap dump involves obtaining the contents of the heap. These contents are often placed or "dumped" into a log file for analysis. This data is often used to determine whether memory leaks are present.

Generating heap dumps in a software production environment is an expensive process. Further, it is often impossible to generate a heap dump because of resource restrictions in the production environment. With the large size of a heap, a high risk of crashing a system, such as a Java virtual machine (JVM), is present when a heap dump is generated. Further, once a heap dump is generated, the size of the log file is typically so large that interpretation of this data requires highly skilled experts. These logs are typically greater than one gigabyte of text. Customers typically do not have the skill needed and many software production companies have very few people with the necessary skill. Additionally, when a heap dump is being generated and written into a file, the heap is locked. In other words, during this time no other thread may run within the JVM. Hence, during the time heap dump is being generated, the JVM can not perform any other activity. All work is halted temperately. It is highly desirable to minimize the time for generating a dump. As the time it takes to write the heap data to the log file is directly proportional to the amount of data to be written, there is little that a user can do to reduce the time it takes to write heap dump to a file.

Generating a heap dump may take several minutes and several heap dumps are typically needed to properly debug a problem involving memory leaks in a heap. Consequently, it is difficult and tedious to debug memory leaks using currently available techniques.

Therefore, it would be advantageous to have an improved method, apparatus, and computer instructions for generating data for use in detecting memory leaks.

SUMMARY OF THE INVENTION

The present invention provides a method, apparatus, and computer instructions for collecting data for analyzing memory leaks. A plurality of indicators are associated with a plurality of objects, such as objects created in a heap. The plurality of indicators are set to a first state, such as a logic zero. An indicator is set for each live object in the plurality of objects to a second state, such as a logic one. This may occur, for example, when initialization of a program is complete. In response to a request for the data dump, data is collected from all objects in the plurality of objects having indicators set to the first state.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is a block diagram illustrating the relationship of software components operating within a computer system that may implement the present invention;

FIG. 4 is a block diagram of a JVM in accordance with a preferred embodiment of the present invention;

FIG. 5 is a diagram illustrating components used to obtain data for detecting memory leaks in accordance with a preferred embodiment of the present invention;

DETAILED DESCRIPTION OF THE PREFERRED EMBODIMENT

Figure 1:
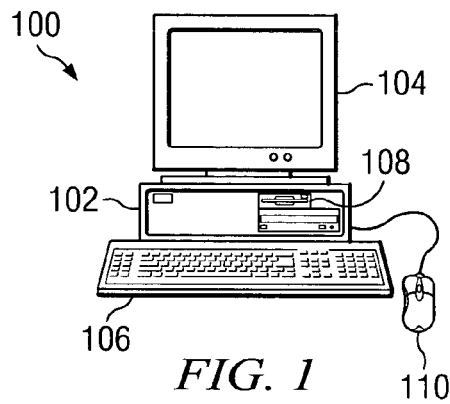
FIG. 1 is a pictorial representation of a data processing system in which the present invention may be implemented in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
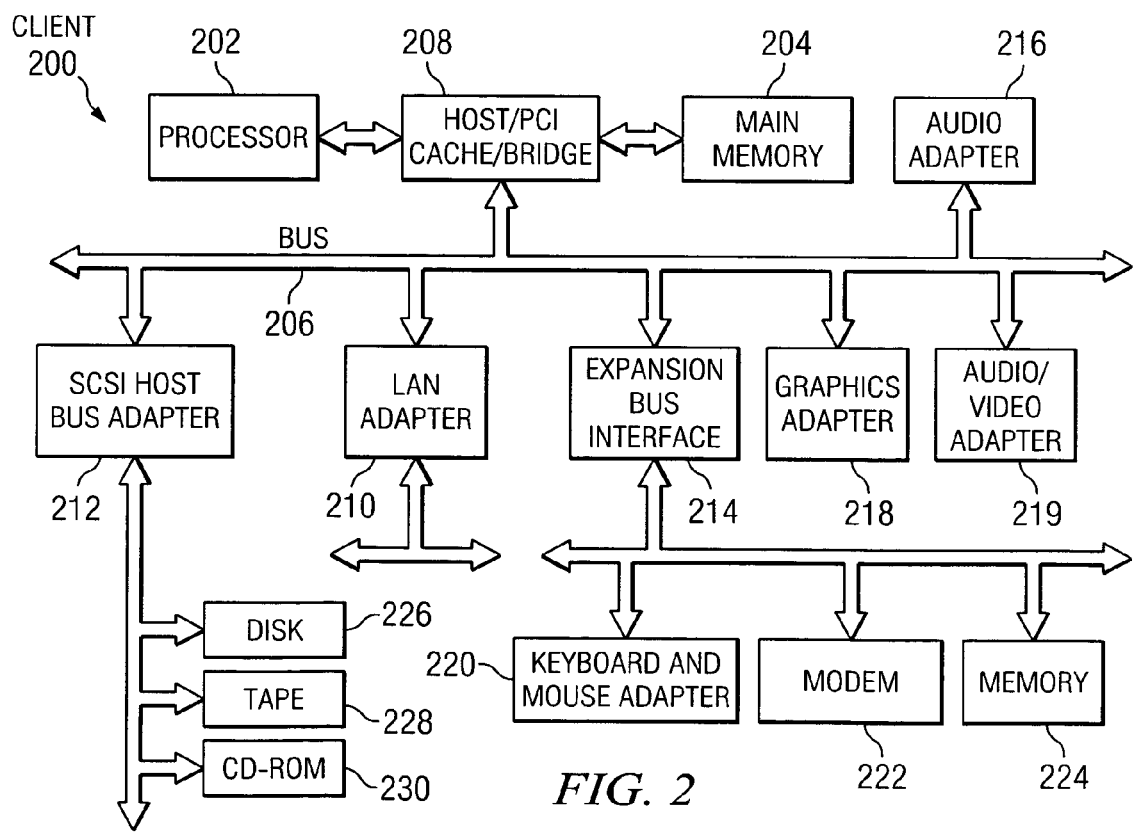
FIG. 2 is a block diagram of a data processing system in which the present invention may be implemented.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows XP, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230. In that case, the computer, to be properly called a client computer, includes some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226–230.

With reference now to FIG. 3, a block diagram illustrates the relationship of software components operating within a computer system that may implement the present invention. Java-based system 300 contains platform specific operating system 302 that provides hardware and system support to software executing on a specific hardware platform. JVM 304 is one software application that may execute in conjunction with the operating system. JVM 304 provides a Java run-time environment with the ability to execute Java application 306, which is a program, servlet, or software component written in the Java programming language. In these illustrative examples, Java application 306 may be, for example, a WebSphere application. WebSphere is Internet infrastructure software, known as middleware. This software enables companies to develop, deploy and integrate next-generation e-business applications, such as those for business-to-business e-commerce, and supports business applications from simple Web publishing through enterprise-scale transaction processing. WebSphere is a registered trademark of International Business Machines (IBM) Corporation.

The computer system in which JVM 304 operates may be similar to data processing system 200 or computer 100 described above. However, JVM 304 may be implemented in dedicated hardware on a so-called Java chip, Java-on-silicon, or Java processor with an embedded picoJava core.

The JVM is the name of a virtual computer component that actually executes Java programs. Java programs are not run directly by the central processor but instead by the JVM, which is itself a piece of software running on the processor. The JVM allows Java programs to be executed on a different platform as opposed to only the one platform for which the code was compiled. Java programs are compiled for the JVM. In this manner, Java is able to support applications for many types of data processing systems, which may contain a variety of central processing units and operating systems architectures. To enable a Java application to execute on different types of data processing systems, a compiler typically generates an architecture-neutral file format—the compiled code is executable on many processors, given the presence of the Java run-time system. The Java compiler generates bytecode instructions that are nonspecific to a particular computer architecture. A bytecode is a machine independent code generated by the Java compiler and executed by a Java interpreter. A Java interpreter is part of the JVM that alternately decodes and interprets a bytecode or bytecodes. These bytecode instructions are designed to be easy to interpret on any computer and easily translated on the fly into native machine code. Byte codes are may be translated into native code by a just-in-time compiler or JIT.

A JVM loads class files and executes the bytecodes within them. The class files are load by a class loader in the JVM. The class loader loads class files from an application and the class files from the Java application programming interfaces (APIs) which are needed by the application. The execution engine that executes the bytecodes may vary across platforms and implementations.

One type of software-based execution engine is a just-in-time compiler. With this type of execution, the bytecodes of a method are compiled to native machine code upon successful fulfillment of some type of criteria for jitting a method. The native machine code for the method is then cached and reused upon the next invocation of the method. The execution engine may also be implemented in hardware and embedded on a chip so that the Java bytecodes are executed natively. JVMs usually interpret bytecodes, but JVMs may also use other techniques, such as just-in-time compiling, to execute bytecodes.

When an application is executed on a JVM that is implemented in software on a platform-specific operating system, a Java application may interact with the host operating system by invoking native methods. A Java method is written in the Java language, compiled to bytecodes, and stored in class files. A native method is written in some other language and compiled to the native machine code of a particular processor. Native methods are stored in a dynamically linked library whose exact form is platform specific.

With reference now to FIG. 4, a block diagram of a JVM is depicted in accordance with a preferred embodiment of the present invention. JVM 400 includes a class loader subsystem 402, which is a mechanism for loading types, such as classes and interfaces, given fully qualified names. JVM 400 also contains runtime data areas 404, execution engine 406, native method interface 408, and memory management 410. Execution engine 406 is a mechanism for executing instructions contained in the methods of classes loaded by class loader subsystem 402. Execution engine 406 may be, for example, Java interpreter 412 or just-in-time compiler 414. Native method interface 408 allows access to resources in the underlying operating system. Native method interface 408 may be, for example, a Java native interface.

Runtime data areas 404 contain native method stacks 416, Java stacks 418, PC registers 420, method area 422, and heap 424. These different data areas represent the organization of memory needed by JVM 400 to execute a program.

Java stacks 418 are used to store the state of Java method invocations. When a new thread is launched, the JVM creates a new Java stack for the thread. The JVM performs only two operations directly on Java stacks: it pushes and pops frames. A thread's Java stack stores the state of Java method invocations for the thread. The state of a Java method invocation includes its local variables, the parameters with which it was invoked, its return value, if any, and intermediate calculations. Java stacks are composed of stack frames. A stack frame contains the state of a single Java method invocation. When a thread invokes a method, the JVM pushes a new frame onto the Java stack of the thread. When the method completes, the JVM pops the frame for that method and discards it. The JVM does not have any registers for holding intermediate values; any Java instruction that requires or produces an intermediate value uses the stack for holding the intermediate values. In this manner, the Java instruction set is well-defined for a variety of platform architectures.

PC registers 420 are used to indicate the next instruction to be executed. Each instantiated thread gets its own pc register (program counter) and Java stack. If the thread is executing a JVM method, the value of the pc register indicates the next instruction to execute. If the thread is executing a native method, then the contents of the pc register are undefined. Native method stacks 414 store the state of invocations of native methods. The state of native method invocations is stored in an implementation-dependent way in native method stacks, registers, or other implementation-dependent memory areas. In some JVM implementations, native method stacks 414 and Java stacks 416 are combined.

Method area 422 contains class data while heap 424 contains all instantiated objects. The JVM specification strictly defines data types and operations. Most JVMs choose to have one method area and one heap, each of which are shared by all threads running inside the JVM. When the JVM loads a class file, it parses information about a type from the binary data contained in the class file. It places this type information into the method area. Each time a class instance or array is created, the memory for the new object is allocated from heap 424. JVM 400 includes an instruction that allocates memory space within the memory for heap 424 but includes no instruction for freeing that space within the memory. Memory management 410 in the depicted example manages memory space within the memory allocated to heap 424. Memory management 410 may include a garbage collector, which automatically reclaims memory used by objects that are no longer referenced. Additionally, a garbage collector also may move objects to reduce heap fragmentation.

The present invention provides a method, apparatus, and computer instructions for generating data to detect memory leaks. Whenever a Java memory leak is suspected, one question that is answered is what objects are involved in the memory leak. Prior to the presently claimed invention, two snapshots or heap dumps were required to answer this question. The mechanism of the present invention only requires one heap dump and reduces the amount of data in the heap dump.

Within the JVM, an indicator is associated with each object that is created or allocated. This indicator may take various forms, but in the illustrative example, the indicator is a single bit. This bit is marked either with a logic one or a logic zero. When an object is created, the associated indicator has a default value of a logic zero. After start-up and initialization, a signal is issued by a process, such as one in a Java application. This signal causes indicators for all of the live objects in the heap to be set to a logic one.

A live object is an object that is reachable from the roots. In other words, an object is reachable if some path of references from the roots is present by which the executing program can execute the object. The roots are always accessible to the program and any object accessible by the roots is considered to be a live object. Objects that are not reachable are considered garbage because these objects can no longer affect the future course of program execution.

The roots set in a JVM are implementation dependent, but always includes any object references in the local variables and operand stack of any stack frame and any object references in any class variables. Other sources of roots include any object references, such as strings, in the constant pool of loaded classes. Another source of roots includes, for example, any part of the JVM run time data areas that are allocated from the garbage-collected heap.

When a memory leak is suspected, a signal may be issued to perform a garbage collection process followed by a dump of data for all objects with an indicator set to a logic zero. In the illustrative embodiment, these objects are ones causing the memory leak. Further, these objects may be sorted based on the total heat space consumed by each object.

With reference now to FIG. 5, a diagram illustrating components used to obtain data for detecting memory leaks is depicted in accordance with a preferred embodiment of the present invention. In this example, heap 500 contains objects 502, 504, 506, and 508. Heap 500 is an example of heap 424 in runtime data areas 404 in FIG. 4. These objects are associated with indicators 510, 512, 514, and 516. When these objects were created or allocated, the value for these indicators were set equal to a default value. In these illustrative examples, the default value is a logic zero.

In response to a signal or request after start-up and initialization, indicators for live objects in heap 500 are set to a logic one. This process may be implemented as a special process within garbage collection process 518. In this example, garbage collection process 518 is found within a memory management process, such as memory management process 410 in FIG. 4.

After some period of time, a second signal or request may be received to generate data for detecting a memory leak. In these illustrative embodiments, garbage collection is performed by garbage collection process 518. Garbage collection process 518 recycles memory when objects are no longer referenced by program. The memory or heap space occupied by unreferenced objects is freed for other use, such as for allocation of new objects.

After garbage collection is performed by garbage collection process 518, heap dump process 520 dumps data for all objects having an indicator set to a logic zero into a log file, such as file 522. The data in file 522 is for objects that are leaking. This data is smaller in size than that normally obtained in a heap dump because garbage collection is performed to remove objects. Also, only objects with an indicator set to a logic zero are dumped into file 522. In many cases, the snapshot data in file 522 may be one tenth the size of a normal heap dump.

Further, only one snapshot or heap dump is required. Previously, one snapshot of heap 500 was required after initialization with a second snapshot being taken of heap 500 when a memory leak was suspected. By using the indicators, only a single snapshot or heap dump is needed. Thus, the mechanism of the presently claimed invention reduces the amount of resources needed to generate data used to detect memory leaks.

Figure 6:
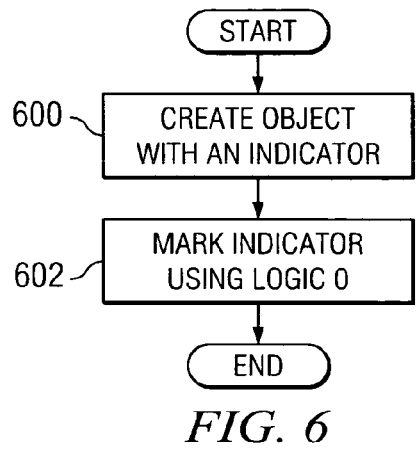
FIG. 6 is a flowchart of a process for creating an object in accordance with a preferred embodiment of the present invention.

Turning next to FIG. 6, a flowchart of a process for creating an object is depicted in accordance with a preferred embodiment of the present invention. The process illustrated in FIG. 6 may be implemented in a JVM, such as JVM 400 in FIG. 4.

The process begins by creating an object with an indicator (step 600). In these examples, the indicator is an extra bit that is allocated with the object. The indicator is marked to a default value of a logic zero (step 602) with the process terminating thereafter. This process is performed for each object that is created.

Figure 7:
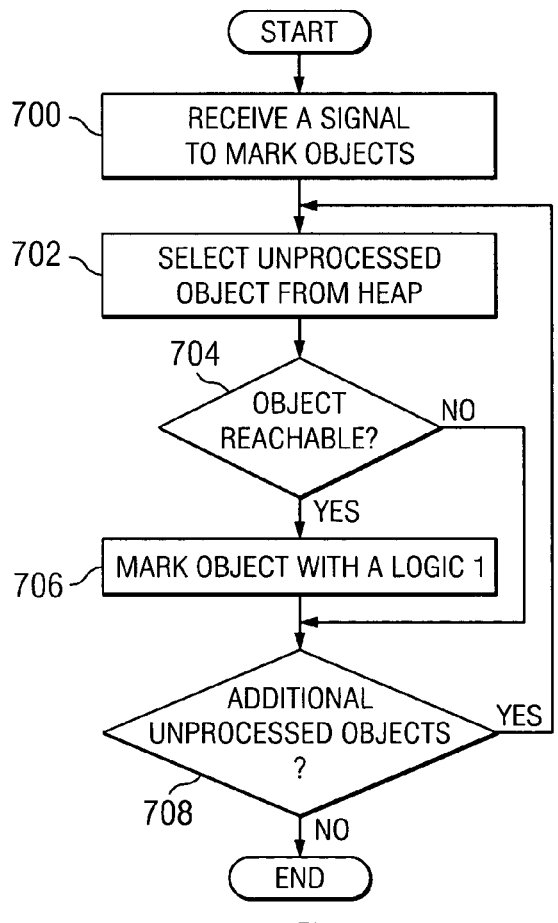
FIG. 7 is a flowchart of a process for marking objects in accordance with a preferred embodiment of the present invention.

With reference now to FIG. 7, a flowchart of a process for marking objects is depicted in accordance with a preferred embodiment of the present invention. The process illustrated in FIG. 7 may be implemented in a JVM process, such as garbage collection process 518 in FIG. 5.

The process begins by receiving a signal to mark objects (step 700). In the illustrative examples, this signal is received from a Java application after initialization of this application. An unprocessed object is selected from the heap (step 702). A determination is made as to whether this object is reachable (step 704). In the depicted examples, the reachability is determined by whether an executing program can access the object from some path of references from the roots. If the object is reachable the object is marked with a logic one (step 706). This step is performed by setting the indicator for the object to a logic one.

A determination is then made as to whether additional unprocessed objects are present in the heap (step 708). An unprocessed object is one that has not been selected for processing as described in step 704 above. If additional unprocessed objects are not present, the process terminates. Otherwise, the process returns to step 702. With reference again to step 704, if the process is not reachable the process returns to step 708 as described above.

Figure 8:
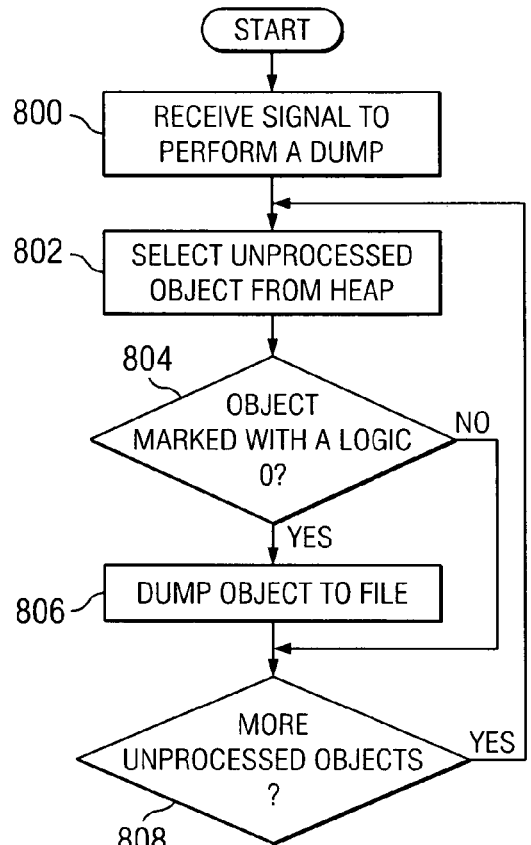
FIG. 8 is a flowchart of a process for dumping data to a file in accordance with a preferred embodiment of the present invention.

Turning to FIG. 8, a flowchart of a process for dumping data to a file is depicted in accordance with a preferred embodiment of the present invention. The process illustrated in FIG. 8 may be implemented in a JVM process, such as heap dump process 520 in FIG. 5. This process is typically performed after garbage collection is performed.

The process begins by receiving a signal to perform a dump (step 800). An unprocessed object is selected from the heap for processing (step 802). A determination is made as to whether this object is marked with a logic zero (step 804). If the object is marked with a logic zero, the object is dumped to a file (step 806).

Thereafter a determination is made as to whether additional unprocessed objects are present in the heap (step 808). If additional unprocessed objects are present, the process returns to step 802. Otherwise, the process terminates. With reference again to step 804, if the object is not marked with the logic zero, the process returns to step 808 as described above.

Thus, the present invention provides a method, apparatus, and computer instructions for identifying data for use in memory leak detection. The mechanism of the present invention allocates an indicator with each object that is created. These indicators are initially set to a default value of a logic zero in the illustrative examples. After some point in time, objects that are live objects have their indicators set to a second value, such as a logic one. When data is needed to determine whether a memory leak has occurred, objects present with a logic zero are dumped into a file. These objects are the ones that are associated with or causing the memory leaks.

In this manner, less data is required for a heap dump to obtain a snapshot. For example, the data may be one tenth the size of current heap dumps that do not employ the present invention. As a result, a JVM is less likely to crash. Further, only one snapshot or heap dump is required using the mechanism of the present invention in the illustrative examples. Therefore, less resources and time are needed to perform debugging of memory leaks.

It is important to note that while the present invention has been described in the context of a fully functioning data processing system, those of ordinary skill in the art win appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a bard disk drive, a RAM, CD-ROMs, DVD-ROMs, and transmission-type media, such as digital and analog communications links, wired or wireless cammimications links. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for collecting data for analyzing memory leaks, the method comprising:
    associating a plurality of indicators with a plurality of objects, wherein the plurality of indicators are set to a first state;
    setting an indicator for each live object in the plurality of objects from the first state to a second state;
    initiating a garbage collection process to free unused objects; and
    responsive to a request for the data, collecting data from all objects in the plurality of objects having indicators set to the first state, wherein the data collected only contains data associated with the memory leaks and wherein the memory leaks occur when unused objects are not freed during the garbage collection process.

2. The method of claim 1, wherein each of the plurality of indicators is a bit associated with a corresponding object in the plurality of objects.

3. The method of claim 2, wherein the first state is a logic zero and the second state is a logic one.

4. The method of claim 1, wherein the method is implemented in a Java virtual machine.

5. The method of claim 1, wherein the data is placed into a text file.

6. The method of claim 1, wherein the plurality of objects are located in a heap.

7. The method of claim 1, wherein the request is received from a Java application.

8. A method in a data processing system for collecting data used to detect memory leaks in a Java virtual machine, the method comprising:
    associating an indicator with an abject in a heap, wherein the indicator is set to a default state;
    responsive to a first request, setting indicators for all live objects in the heap from the default state to a live state; and
    responsive to a second request, collecting information for all objects having indicators in the default state after a garbage collection process, executes to free unused objects, wherein objects having indicators in the default state are objects with memory leaks.

9. The method of claim 8, wherein the indicator is associated with the object when the object is created.

10. The method of claim 8, wherein the first request and the second request are received from a Java application.

11. The method of claim 8, wherein the indicator set to the live state is a logic one and the indicator set to the default state is a logic zero.

12. A data processing system for collecting data for analyzing memory leaks, the data processing system comprising:
    associating means for associating a plurality of indicators with a plurality of objects, wherein the plurality of indicators are set to a first state;
    setting means for setting an indicator for each live object in the plurality of objects from the first state to a second state;
    initiating means for initiating a garbage collection process to free unused objects; and
    collecting means, responsive to a request far the data, for collecting data from all objects in the plurality of objects having indicators set to the first state, wherein the data collected only contains data associated with the memory leaks and wherein the memory leaks occur when unused objects are not freed during the garbage collection process.

13. The data processing system of claim 12, wherein each of the plurality of indicators is a bit associated with a corresponding object in the plurality of objects.

14. The data processing system of claim 13, wherein the first state is a logic zero and the second state is a logic one.

15. The data processing system of claim 12, wherein the method is implemented in a Java virtual machine.

16. A data processing system for collecting data used to detect memory leaks in a Java virtual machine, the data processing system comprising:
    associating means for associating an indicator with an object in a heap, wherein the indicator is set to a default state;
    setting means, responsive to a first request, for setting indicators fir all live objects in the heap from the default state to a live state; and
    collecting means, responsive to a second request, for collecting information for all objects having indicators in the default state after a garbage collection process executes to free unused objects, wherein objects having indicators in the default state are objects with memory leaks.

17. A computer program product in a computer readable medium for collecting data for analyzing memory leaks, the computer program product comprising:
    first instructions for associating a plurality of indicators with a plurality of objects, wherein the plurality of indicators are set to a first state;

second instructions for setting an indicator for each live object in the plurality of objects from the first state to a second state;

third instructions for initiating a garbage collection process to free unused objects; and fourth instructions, responsive to a request for the data, for collecting data from all objects in the plurality of objects having indicators set to the first state, wherein the data collected only contains data associated with the memory leaks and wherein the memory leaks occur when unused objects are not freed during the garbage collection process.

18. The computer program product of claim 17, wherein each of the plurality of indicators is a bit associated with a corresponding object in the plurality of objects.

19. The computer program product of claim 18, wherein the first state is a logic zero and the second state is a logic one.

20. The computer program product of claim 17, wherein the method is implemented in a Java virtual machine.

21. A computer program product in a computer readable medium in a data processing system for collecting data used to detect memory leaks In a Java virtual machine, the computer program product comprising:

first instructions for associating an indicator wit an object in a heap, wherein to indicator is set to a default state;

second instructions, responsive to a first request for setting indicators for all live objects in the heap from the default state to a live state; and third instructions, responsive to a second request, for collecting information for all objects having indicators in the default state after a garbage collection process executes to flee unused objects, wherein objects having indicators in the default state are objects with memory leaks.

22. The computer program product of claim 21, wherein the indicator is associated with the object when the object is created.

23. The computer program product of claim 21, wherein the first request and the second request are received from a lava application.

24. A data processing system comprising:

a bus system;

a memory connected to the bus system, wherein the memory includes a set of instructions; and a processing unit connected to the bus system, wherein the processing unit executes a set of instructions to associate a plurality of indicators with a plurality of objects, wherein the plurality of indicators are set to a first state; set an indicator for each live object in the plurality of objects from the first state to a second state; initiate a garbage collection process to free unused objects; and collect data from all objects in the plurality of objects having indicators set to the first state, in response to a request for the data, wherein the data collected only contains data associated with the memory leaks and wherein the memory leaks occur when unused objects are not freed during the garbage collection process.

25. A data processing system comprising:

a bus system;

a memory connected to the bus system, wherein the memory includes a set of instructions; and a processing unit connected to the bus system, wherein the processing unit executes a set of instructions to associate an indicator with an object a heap, wherein the indicator is set to a default state; set indicators for all live objects in the heap from the default state to a live state, in response to a first request; and collect information for all objects having indicators in the default state alter a garbage collection process executes to free unused objects, wherein objects having indicators in the default slate are objects with memory leaks, in response to a second request.

* * * * *

UNITED STATES PATENT AND TRADEMARK OFFICE
CERTIFICATE OF CORRECTION

PATENT NO. : 7,100,003 B2
APPLICATION NO. : 10/720436
DATED : August 29, 2006
INVENTOR(S) : Betancourt et al.

It is certified that error appears in the above-identified patent and that said Letters Patent is hereby corrected as shown below:

Col. 10, line 4: after "with an" delete "abject" and insert --object--.

Col. 10, line 11: after "process" delete " , ".

Col. 10, line 53: after "indicators" delete "fir" and insert --for--.

Col. 11, line 23: after "leaks" delete "In" and insert --in--.

Col. 11, line 25: after "indicator" delete "wit" and insert --with--

Col. 11, line 26: after "wherein" delete "to" and insert --the--.

Col. 11, line 33: after "executes to" delete "flee" and insert --free--.

Col. 12, line 3: before "application" delete "lava" and insert --Java--.

Col. 12, line 32: after "state" delete "alter" and insert --after--.

Col. 12, line 34: after "default" delete "slate" and insert --state--.

Signed and Sealed this

Tenth Day of April, 2007

JON W. DUDAS
*Director of the United States Patent and Trademark Office*